(12) United States Patent
Simpson et al.

(10) Patent No.: US 9,577,815 B1
(45) Date of Patent: Feb. 21, 2017

(54) CLOCK DATA ALIGNMENT SYSTEM FOR VECTOR SIGNALING CODE COMMUNICATIONS LINK

(71) Applicant: Kandou Labs, S.A., Lausanne (CH)

(72) Inventors: Richard Simpson, Bedford (GB); Andrew Kevin John Stewart, Astcote (GB); Ali Hormati, Ecublens Vaud (CH)

(73) Assignee: Kandou Labs, S.A. (CH)

( * ) Notice: Subject to any disclaimer, the term of this patent is extended or adjusted under 35 U.S.C. 154(b) by 0 days.

(21) Appl. No.: 14/926,958

(22) Filed: Oct. 29, 2015

(51) Int. Cl.
H04L 7/00 (2006.01)

(52) U.S. Cl.
CPC ............. H04L 7/0012 (2013.01); H04L 7/002 (2013.01)

(58) Field of Classification Search
CPC .... H04L 7/0337; H04L 7/0025; H04L 7/0054; H04L 7/0012; H04L 7/002; H03L 7/0995; H03L 7/087; H03L 7/091; H03L 7/0998
See application file for complete search history.

(56) References Cited

U.S. PATENT DOCUMENTS

| | | |
|---|---|---|
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara |
| 4,181,967 A | 1/1980 | Nash |
| 4,206,316 A | 6/1980 | Burnsweig |
| 4,276,543 A | 6/1981 | Miller |
| 4,486,739 A | 12/1984 | Franaszek |
| 4,499,550 A | 2/1985 | Ray, III |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,053,974 A | 10/1991 | Penz |
| 5,166,956 A | 11/1992 | Baltus |
| 5,168,509 A | 12/1992 | Nakamura |
| 5,283,761 A | 2/1994 | Gillingham |
| 5,287,305 A | 2/1994 | Yoshida |
| 5,311,516 A | 5/1994 | Kuznicki |
| 5,412,689 A | 5/1995 | Chan |
| 5,449,895 A | 9/1995 | Hecht |
| 5,459,465 A | 10/1995 | Kagey |

(Continued)

FOREIGN PATENT DOCUMENTS

| | | |
|---|---|---|
| CN | 101478286 | 7/2009 |
| EP | 2039221 | 2/2013 |

(Continued)

OTHER PUBLICATIONS

International Search Report and Written Opinion of the International Searching Authority, mailed Nov. 5, 2012, in International Patent Application S.N. PCT/EP2012/052767, 7 pages.

(Continued)

Primary Examiner — Vineeta Panwalkar
(74) Attorney, Agent, or Firm — Invention Mine LLC

(57) ABSTRACT

A communications system receiver is described providing automatic timing adjustment of receive data sampling. A concurrently received clock signal is used as both a reference for generation of internal receiver timing signals, and as an exemplar for adjustment of those timing signals to optimize received data sample timing.

20 Claims, 10 Drawing Sheets

(56) References Cited

U.S. PATENT DOCUMENTS

| | | |
|---|---|---|
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,659,353 A | 8/1997 | Kostreski |
| 5,727,006 A | 3/1998 | Dreyer |
| 5,802,356 A * | 9/1998 | Gaskins .................. G06F 1/08 713/500 |
| 5,825,808 A | 10/1998 | Hershey |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,999,016 A | 12/1999 | McClintock |
| 6,005,895 A | 12/1999 | Perino |
| 6,084,883 A | 7/2000 | Norrell |
| 6,119,263 A | 9/2000 | Mowbray |
| 6,172,634 B1 | 1/2001 | Leonowich |
| 6,175,230 B1 | 1/2001 | Hamblin |
| 6,232,908 B1 | 5/2001 | Nakaigawa |
| 6,278,740 B1 | 8/2001 | Nordyke |
| 6,346,907 B1 | 2/2002 | Dacy |
| 6,359,931 B1 | 3/2002 | Perino |
| 6,378,073 B1 | 4/2002 | Davis |
| 6,398,359 B1 | 6/2002 | Silverbrook |
| 6,404,820 B1 | 6/2002 | Postol |
| 6,417,737 B1 | 7/2002 | Moloudi |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,556,628 B1 | 4/2003 | Poulton |
| 6,563,382 B1 | 5/2003 | Yang |
| 6,621,427 B2 | 9/2003 | Greenstreet |
| 6,624,699 B2 | 9/2003 | Yin |
| 6,650,638 B1 | 11/2003 | Walker |
| 6,661,355 B2 | 12/2003 | Cornelius |
| 6,766,342 B2 | 7/2004 | Kechriotis |
| 6,839,429 B1 | 1/2005 | Gaikwad |
| 6,839,587 B2 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,898,724 B2 | 5/2005 | Chang |
| 6,927,709 B2 | 8/2005 | Kiehl |
| 6,954,492 B1 | 10/2005 | Williams |
| 6,990,138 B2 | 1/2006 | Bejjani |
| 6,999,516 B1 | 2/2006 | Rajan |
| 7,023,817 B2 | 4/2006 | Kuffner |
| 7,053,802 B2 | 5/2006 | Cornelius |
| 7,075,996 B2 | 7/2006 | Simon |
| 7,085,153 B2 | 8/2006 | Ferrant |
| 7,085,336 B2 | 8/2006 | Lee |
| 7,130,944 B2 | 10/2006 | Perino |
| 7,142,612 B2 | 11/2006 | Horowitz |
| 7,142,865 B2 | 11/2006 | Tsai |
| 7,164,631 B2 | 1/2007 | Tateishi |
| 7,167,019 B2 | 1/2007 | Broyde |
| 7,180,949 B2 | 2/2007 | Kleveland |
| 7,184,483 B2 | 2/2007 | Rajan |
| 7,269,212 B1 | 9/2007 | Chau |
| 7,335,976 B2 | 2/2008 | Chen |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,370,264 B2 | 5/2008 | Worley |
| 7,389,333 B2 | 6/2008 | Moore |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,535,957 B2 | 5/2009 | Ozawa |
| 7,570,704 B2 | 8/2009 | Nagarajan |
| 7,599,390 B2 | 10/2009 | Pamarti |
| 7,620,116 B2 | 11/2009 | Bessios |
| 7,633,850 B2 | 12/2009 | Ahn |
| 7,639,596 B2 | 12/2009 | Cioffi |
| 7,643,588 B2 | 1/2010 | Visalli |
| 7,656,321 B2 | 2/2010 | Wang |
| 7,697,915 B2 | 4/2010 | Behzad |
| 7,706,456 B2 | 4/2010 | Laroia |
| 7,706,524 B2 | 4/2010 | Zerbe |
| 7,746,764 B2 | 6/2010 | Rawlins |
| 7,787,572 B2 | 8/2010 | Scharf |
| 7,804,361 B2 | 9/2010 | Lim |
| 7,808,883 B2 | 10/2010 | Green |
| 7,841,909 B2 | 11/2010 | Murray |
| 7,869,497 B2 | 1/2011 | Benvenuto |
| 7,869,546 B2 | 1/2011 | Tsai |
| 7,882,413 B2 | 2/2011 | Chen |
| 7,899,653 B2 | 3/2011 | Hollis |
| 7,907,676 B2 | 3/2011 | Stojanovic |
| 7,933,770 B2 | 4/2011 | Kruger |
| 8,036,300 B2 | 10/2011 | Evans |
| 8,055,095 B2 | 11/2011 | Palotai |
| 8,064,535 B2 | 11/2011 | Wiley |
| 8,085,172 B2 | 12/2011 | Li |
| 8,091,006 B2 | 1/2012 | Prasad |
| 8,106,806 B2 | 1/2012 | Toyomura |
| 8,149,906 B2 | 4/2012 | Saito |
| 8,159,375 B2 | 4/2012 | Abbasfar |
| 8,159,376 B2 | 4/2012 | Abbasfar |
| 8,185,807 B2 | 5/2012 | Oh |
| 8,199,849 B2 | 6/2012 | Oh |
| 8,218,670 B2 | 7/2012 | Abou Rjeily |
| 8,253,454 B2 * | 8/2012 | Lin .......................... H03L 7/07 327/147 |
| 8,279,094 B2 | 10/2012 | Abbasfar |
| 8,295,250 B2 | 10/2012 | Gorokhov |
| 8,310,389 B1 | 11/2012 | Chui |
| 8,365,035 B2 | 1/2013 | Hara |
| 8,406,315 B2 | 3/2013 | Tsai |
| 8,429,495 B2 | 4/2013 | Przybylski |
| 8,442,099 B1 | 5/2013 | Sederat |
| 8,442,210 B2 | 5/2013 | Zerbe |
| 8,443,223 B2 | 5/2013 | Abbasfar |
| 8,451,913 B2 | 5/2013 | Oh |
| 8,462,891 B2 | 6/2013 | Kizer |
| 8,472,513 B2 | 6/2013 | Malipatil |
| 8,498,344 B2 | 7/2013 | Wilson |
| 8,498,368 B1 | 7/2013 | Husted |
| 8,520,348 B2 | 8/2013 | Dong |
| 8,520,493 B2 | 8/2013 | Goulahsen |
| 8,539,318 B2 | 9/2013 | Cronie |
| 8,547,272 B2 | 10/2013 | Nestler |
| 8,577,284 B2 | 11/2013 | Seo |
| 8,578,246 B2 | 11/2013 | Mittelholzer |
| 8,588,254 B2 | 11/2013 | Diab et al. |
| 8,588,280 B2 | 11/2013 | Oh |
| 8,593,305 B1 | 11/2013 | Tajalli |
| 8,638,241 B2 | 1/2014 | Sudhakaran |
| 8,649,445 B2 | 2/2014 | Cronie |
| 8,649,840 B2 | 2/2014 | Sheppard, Jr. |
| 8,711,919 B2 | 4/2014 | Kumar |
| 8,718,184 B1 | 5/2014 | Cronie |
| 8,780,687 B2 | 7/2014 | Clausen |
| 8,782,578 B2 | 7/2014 | Tell |
| 8,879,660 B1 | 11/2014 | Peng |
| 8,897,134 B2 | 11/2014 | Kern |
| 8,949,693 B2 | 2/2015 | Ordentlich |
| 8,951,072 B2 | 2/2015 | Hashim |
| 8,975,948 B2 | 3/2015 | Gonzalez Diaz |
| 8,989,317 B1 | 3/2015 | Holden |
| 9,015,566 B2 | 4/2015 | Cronie |
| 9,020,049 B2 | 4/2015 | Schwager |
| 9,036,764 B1 * | 5/2015 | Hossain ................ H03L 7/087 375/355 |
| 9,069,995 B1 | 6/2015 | Cronie |
| 9,077,386 B1 | 7/2015 | Holden |
| 9,093,791 B2 | 7/2015 | Liang |
| 9,100,232 B1 | 8/2015 | Hormati |

(56) References Cited

U.S. PATENT DOCUMENTS

| | | |
|---|---|---|
| 9,106,465 B2 | 8/2015 | Walter |
| 9,124,557 B2 | 9/2015 | Fox |
| 9,165,615 B2 | 10/2015 | Amirkhany |
| 9,172,412 B2 | 10/2015 | Kim |
| 9,197,470 B2 | 11/2015 | Okunev |
| 9,281,785 B2 | 3/2016 | Sjoland |
| 9,288,089 B2 | 3/2016 | Cronie |
| 9,292,716 B2 | 3/2016 | Winoto |
| 9,331,962 B2 | 5/2016 | Lida |
| 9,362,974 B2 | 6/2016 | Fox |
| 9,374,250 B1 | 6/2016 | Musah |
| 2002/0034191 A1 | 3/2002 | Shattil |
| 2002/0044316 A1 | 4/2002 | Myers |
| 2002/0057592 A1 | 5/2002 | Robb |
| 2002/0154633 A1 | 10/2002 | Shin |
| 2002/0163881 A1 | 11/2002 | Dhong |
| 2002/0174373 A1 | 11/2002 | Chang |
| 2003/0071745 A1 | 4/2003 | Greenstreet |
| 2003/0086366 A1 | 5/2003 | Branlund |
| 2003/0146783 A1 | 8/2003 | Bandy |
| 2004/0003336 A1 | 1/2004 | Cypher |
| 2004/0003337 A1 | 1/2004 | Cypher |
| 2004/0057525 A1 | 3/2004 | Rajan |
| 2004/0156432 A1 | 8/2004 | Hidaka |
| 2005/0057379 A1 | 3/2005 | Jansson |
| 2005/0174841 A1 | 8/2005 | Ho |
| 2005/0213686 A1 | 9/2005 | Love |
| 2006/0115027 A1 | 6/2006 | Srebranig |
| 2006/0159005 A1 | 7/2006 | Rawlins |
| 2007/0188367 A1 | 8/2007 | Yamada |
| 2007/0260965 A1 | 11/2007 | Schmidt |
| 2007/0263711 A1 | 11/2007 | TheodorKramer |
| 2007/0265533 A1 | 11/2007 | Tran |
| 2007/0283210 A1 | 12/2007 | Prasad |
| 2008/0104374 A1 | 5/2008 | Mohamed |
| 2008/0273623 A1 | 11/2008 | Chung |
| 2008/0284524 A1 | 11/2008 | Kushiyama |
| 2009/0059782 A1 | 3/2009 | Cole |
| 2009/0132758 A1 | 5/2009 | Jiang |
| 2009/0257542 A1 | 10/2009 | Evans |
| 2010/0023838 A1 | 1/2010 | Shen |
| 2010/0046644 A1 | 2/2010 | Mazet |
| 2010/0104047 A1 | 4/2010 | Chen |
| 2010/0180143 A1 | 7/2010 | Ware |
| 2010/0296550 A1 | 11/2010 | AbouRjeily |
| 2010/0296556 A1 | 11/2010 | Rave |
| 2011/0072330 A1 | 3/2011 | Kolze |
| 2011/0235501 A1 | 9/2011 | Goulahsen |
| 2011/0299555 A1 | 12/2011 | Cronie |
| 2012/0063291 A1 | 3/2012 | Hsueh |
| 2012/0152901 A1 | 6/2012 | Nagorny |
| 2012/0161945 A1 | 6/2012 | Single |
| 2014/0226455 A1 | 8/2014 | Schumacher |
| 2015/0010044 A1 | 1/2015 | Zhang |
| 2015/0078479 A1 | 3/2015 | Whitby-Strevens |
| 2015/0333940 A1 | 11/2015 | Shokrollahi |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion of the International Searching Authority, mailed Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

International Search Report for PCT/US2014/053563, dated Nov. 11, 2014, 2 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method for the Analysis of Signals: the Square-Wave Method, Mar. 2008, Revista de Matematica: Teoria y Aplicationes, pp. 109-129.

International Search Report and Written Opinion from PCT/US2014/034220 mailed Aug. 21, 2014.

International Search Report and Written Opinion for PCT/US14/052986 mailed Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallini, L., et al., "Transmission Time Analysis for the Parallel Asynchronous Communication Scheme", IEEE Transactions on Computers, vol. 52, No. 5, May 2003, pp. 558-571.

International Search Report and Written Opinion for PCT/EP2012/052767 mailed May 11, 2012.

International Search Report and Written Opinion for PCT/EP2011/059279 mailed Sep. 22, 2011.

International Search Report and Written Opinion for PCT/EP2011/074219 mailed Jul. 4, 2012.

Notification of Transmittal of The International Search Report and The Written Opinion of the International Searching Authority, or The Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Cheng, W., "Memory Bus Encoding for Low Power: A Tutorial", Quality Electronic Design, IEEE, International Symposium on Mar. 26-28, 2001, pp. 199-204, Piscataway, NJ.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Notification of Transmittal of International Search Report and The Written Opinion Of the International Searching Authority, for PCT/US2015/018363, mailed Jun. 18, 2015, 13 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

(56) References Cited

OTHER PUBLICATIONS

Grahame, J., "Vintage Analog Computer Kits," posted on Aug. 25, 2006 in Classic Computing, 2 pages, http.//www.retrothing.com/2006/08/classic_analog_.html.

Schneider, J., et al., "ELEC301 Project: Building an Analog Computer," Dec. 19, 1999, 8 pages, http://www.clear.rice.edu/elec301/Projects99/anlgcomp/.

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

"Introduction to: Analog Computers and the DSPACE System," Course Material ECE 5230 Spring 2008, Utah State University, www.coursehero.com, 12 pages.

Notification of Transmittal of The International Search Report and The Written Opinion of the International Searching Authority, or the Declaration, for PCT/US2014/015840, dated May 20, 2014. 11 pages.

Notification of Transmittal of The International Search Report and The Written Opinion of the International Searching Authority, or the Declaration, for PCT/US2014/043965, dated Oct. 22, 2014, 10 pages.

Notification of Transmittal of The International Search Report and The Written Opinion of the International Searching Authority, or The Declaration, dated Mar. 3, 2015, for PCT/US2014/066893, 9 pages.

Jiang, A., et al., "Rank Modulation for Flash Memories", IEEE Transactions of Information Theory, Jun. 2006, vol. 55, No. 6, pp. 2659-2673.

Zouhair Ben-Neticha et al, "The 'streTched—Golay and other codes for high-SNR finite-delay quantization of the Gaussian source at ½Bit per sample", IEEE Transactions on Communications, vol. 38, No. 12 Dec. 1, 1990, pp. 2089-2093, XP000203339, IISN: 0090-6678, DOI: 10.1109/26.64647.

Oh, et al., Pseudo-Differential Vector Signaling for Noise Reduction in Single-Ended Ended Signaling, DesignCon 2009.

Loh, M., et al., "A 3×9 Gb/s Shared, All-Digital CDR for High-Speed, High-Density I/O", Matthew Loh, IEEE Journal of Solid-State Circuits, Vo. 47, No. 3, Mar. 2012.

Notification of Transmittal of the International Search Report and The Written Opinion of the International Searching Authority, or the Declaration, for PCT/US2015/039952, dated Sep. 23, 2015, 8 pages.

Notification of Transmittal of the International Search Report and the Written Opinion of the International Searching Authority, or the Declaration, for PCT/US2015/041161, dated Oct. 7, 2015, 8 pages.

Notification of Transmittal of the International Search Report and the Written Opinion of the International Searching Authority, or the Declaration, for PCT/US2015/043463, dated Oct. 16, 2015, 8 pages.

Notification of Transmittal of the International Search Report and the Written Opinion of the International Searching Authority, or the Declaration, for PCT/US2015/037466, dated Nov. 19, 2015.

* cited by examiner

CLOCK DATA ALIGNMENT SYSTEM FOR VECTOR SIGNALING CODE COMMUNICATIONS LINK

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. Patent Publication 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II").

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III").

U.S. patent application Ser. No. 13/176,657, filed Jul. 5, 2011, naming Harm Cronie and Amin Shokrollahi, entitled "Methods and Systems for Low-power and Pin-efficient Communications with Superposition Signaling Codes" (hereinafter "Cronie IV").

U.S. patent application Ser. No. 13/542,599, filed Jul. 5, 2012, naming Armin Tajalli, Harm Cronie, and Amin Shokrollhi entitled "Methods and Circuits for Efficient Processing and Detection of Balanced Codes" (hereafter called "Tajalli I".)

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I].

U.S. patent application Ser. No. 14/816,896, filed Aug. 3, 2015, naming Brian Holden and Amin Shokrollahi, entitled "Orthogonal Differential Vector Signaling Codes with Embedded Clock", hereinafter identified as [Holden II].

U.S. Provisional Patent Application No. 61/946,574, filed Feb. 28, 2014, naming Amin Shokrollahi, Brian Holden, and Richard Simpson, entitled "Clock Embedded Vector Signaling Codes", hereinafter identified as [Shokrollahi I].

U.S. patent application Ser. No. 14/612,241, filed Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi II].

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I].

The following additional references to prior art have been cited in this application:

U.S. Pat. No. 6,509,773, filed Apr. 30, 2001 by Buchwald et al., entitled "Phase interpolator device and method" (hereafter called "Buchwald I".)

"A 3×9 Gb/s Shared, All-Digital CDR for High-Speed, High-Density I/O", Matthew Loh, Azita Emami-Neyestanak, IEEE Journal of Solid-State Circuits, Vo. 47, No. 3, March 2012 (hereafter called "Loh I".]

FIELD OF THE INVENTION

Present embodiments relate to communications systems circuits generally, and more particularly to obtaining a stable, correctly phased receiver clock signal from a high-speed multi-wire interface used for chip-to-chip communication.

BACKGROUND

In modern digital systems, digital information has to be processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods have been proposed to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals from the transmitter to one or more receivers. At the receiver, the received signals corresponding to the codeword are transformed back into the original digital information representation space. Herein, this process is referred to as "decoding".

Regardless of the encoding method used, the received signals presented to the receiving device must be sampled (or their signal value otherwise recorded) at intervals best representing the original transmitted values, regardless of transmission channel delays, interference, and noise. This Clock and Data Recovery (CDR) not only must determine the appropriate sample timing, but must continue to do so continuously, providing dynamic compensation for varying signal propagation conditions.

BRIEF DESCRIPTION

In a communications system incorporating multiple data communications signals and at least one dedicated clock signal, a receiver must not only reliably detect the data values and synchronize to the dedicated clock signal, but must also be configurable to align the resulting synthesized clock with the received data to optimize receive data sampling. Conventionally, such alignment requires introduction of additional data sampling stages configured to detect data edge transitions that then serve as alignment references for subsequent clock phase adjustment.

In comparison, the described receiver system performs both clock synthesis and edge detection upon the received clock signal. The resulting design is both simpler and easier to scale to higher speed operation with minimal power consumption.

DETAILED DESCRIPTION

Figure 1:
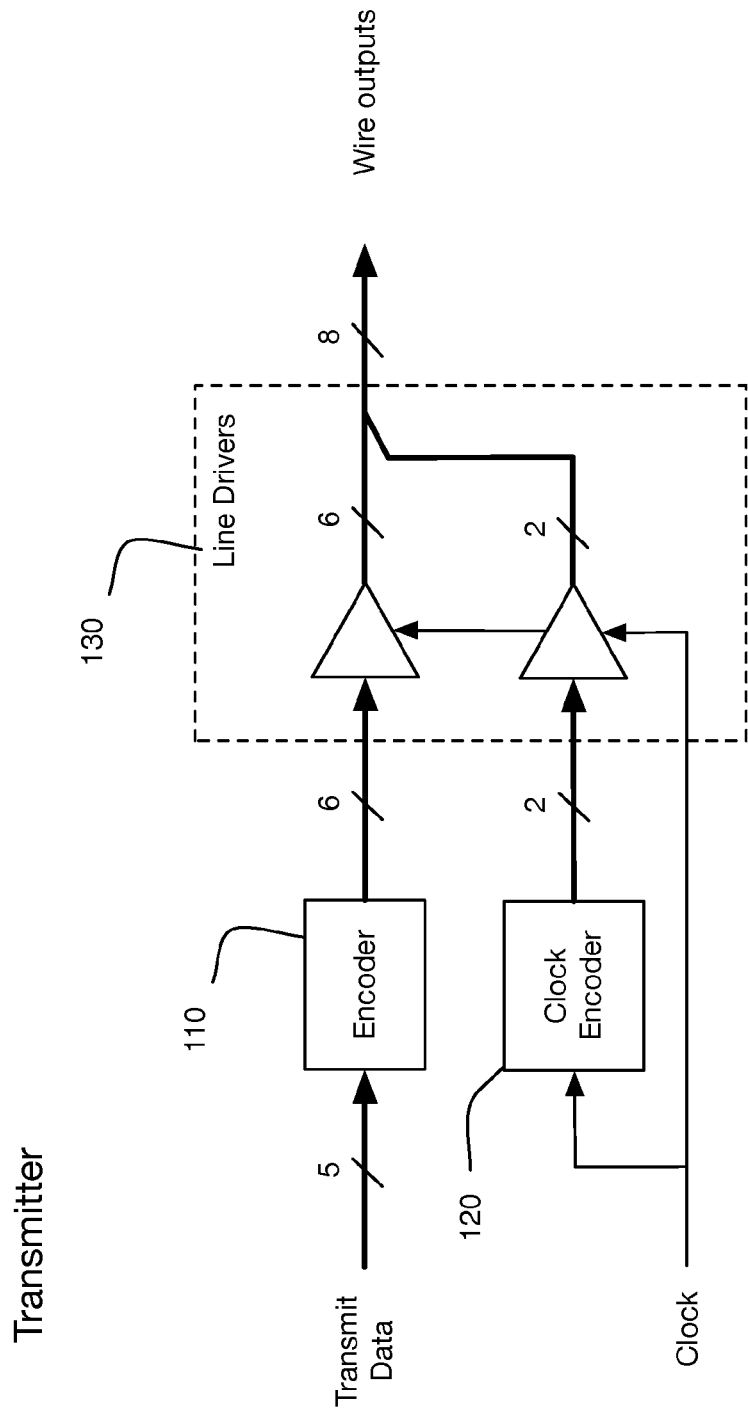
FIG. 1 is a block diagram of one embodiment configured to encode and transmit five data bits and a clock on an eight-wire communications channel.

As described in [Cronie I], [Cronie II], [Cronie III] and [Cronie IV], vector signaling codes may be used to produce extremely high bandwidth data communications links, such as between two integrated circuit devices in a system. Multiple data communications channels transmit symbols of the vector signaling code, acting together to communicate codewords of the vector signaling code. Depending on the particular vector signaling code used, the number of channels comprising a communications link may range from two to eight or more. Individual symbols, e.g. transmissions on any single communications channel, may utilize multiple signal levels, often three or more. Operation at channel rates exceeding 10 Gbps may further complicate receive behavior by requiring deeply pipelined or parallelized signal processing, precluding reception methods that require the previous received value to be known as the current value is being received.

Embodiments described herein can also be applied to prior art permutation sorting methods not covered by the vector processing methods of [Cronie II], [Cronie III], [Cronie IV], and/or [Tajalli I]. More generally, embodiments can apply to any communication or storage methods requiring coordination of multiple channels or elements of the channel to produce a coherent aggregate result.

Input Sampling Circuits

Conventional practice for a high-speed integrated circuit receiver requires each data line to terminate (after any relevant front end processing such as amplification and frequency equalization) in a sampling device. This sampling device performs a measurement constrained in both time and amplitude dimensions; in one example embodiment, it may be comprised of a sample-and-hold circuit that constrains the time interval being measured, followed by a threshold detector or digital comparator that determines whether the signal within that interval falls above or below (or in some embodiments, within bounds set by) a reference value. Alternatively, a digital comparator may determine the signal amplitude followed by a clocked digital flip-flop capturing the result at a selected time. In another embodiment, it may be comparable to an edge-triggered D flip-flop, sampling the state of its input in response to a clock transition. Subsequently, this document will use the term sampling device, or more simply "sampler" to describe this receiver input measurement function as it implies both the time and amplitude measurement constraints, rather than the equivalent but less descriptive term "slicer" also used in the art.

The well known receiver "eye plot" graphically illustrates input signal values that will or will not provide accurate and reliable detected results from such measurement, and thus the allowable boundaries of the time and amplitude measurement windows imposed on the sampler. This document will henceforth use the term sampling device, or more simply "sampler" as it implies both the time and amplitude measurement constraints, rather than the equivalent but less descriptive term "slicer" also used in the art.

So-called Clock Data Recovery or CDR circuits support such sampling measurements by extracting timing information, either from the data lines themselves or from dedicated clock signal inputs, and utilize that extracted information to generate clock signals to control the time interval used by the data line sampling device(s). The actual clock extraction may be performed using well known circuits such as a Phase Locked Loop (PLL) or Delay Locked Loop (DLL), which in their operation may also generate higher frequency internal clocks, multiple clock phases, etc. in support of receiver operation.

As there may be unavoidable timing skews between signal lines and the recovered clock, it is common practice to incorporate secondary data line sampling circuits which may be intentionally offset by controlled amounts of time and/or amplitude, so as to determine the receive eye edges and thus discern whether the data sample timing or threshold level is optimally configured. One example of such art is given by [Loh I]. Unfortunately, the addition of such secondary sampling circuits to multiple high-speed data inputs requires a significant increase in integrated circuit real estate, and well as producing a substantial increase in power consumption.

Such secondary sampling is required in conventional designs for several reasons. First, the interconnection wiring between transmitter and receiver may be of significant length and/or have significantly distinct transmission line characteristics across the set of signal wires, leading to differential amplitude, frequency, and timing characteristics among the data wires and between the data wires and any dedicated clock wires. Second, the design of the integrated circuit transmitter and receiver may be different for data wires and for clock wires based on the different internal processing performed for data and for clock signals, leading to an inevitable differential timing behavior between those signal inputs. Finally, the phase relationships among the various signals may vary over time or with supply voltage, potentially requiring periodic adjustment. Thus, it is impractical for a conventional embodiment to rely upon a particular predetermined timing relationship between a clock input and an appropriate data sampling interval, as a result of these unpredictable or variable sources of timing error.

System Environment

Unlike the complex and variable transmission line environments seen in general purpose communications networks, it is possible to tightly constrain the operating environment for communication between, for example, two closely spaced integrated circuit devices on the same printed circuit board. In such an environment, communication path distances are measured in millimeters rather than centimeters or meters, and transmission line characteristics may be tightly controlled by imposing strict design rules on trace routing and spacing. These constraints allow differential wire skew to be limited by design to a fraction of a transmission unit interval.

For purposes of description and without implying limitation, the following examples assume a communications system environment comprising interconnection of one transmitting and one receiving integrated circuit device via eight signal wires of equal path length up to 25 millimeters and identical transmission line characteristics, at signaling rates up to 25 Gigabit/second/wire, equivalent to a transmission unit interval of 40 picoseconds. In such an example environment, adequate signal reception may be obtained using Continuous Time Linear Equalization or CTLE, without need for advanced receive equalization such as obtained using Decision Feedback Equalization or DFE methods.

One embodiment described herein incorporates a receiver using four parallel processing slices associated with respective phases, each phase sampling, detecting, and decoding the vector code communicated during a single unit interval. Thus, each phase has as much as 4*40=160 picoseconds to perform the necessary processing.

Ramifications of the Constrained System Environment

Given the design constraints placed upon the multiple signal wires comprising the communications medium and a further constraint that the transmitter emit signals essentially simultaneously on the various wires and that the receiver similarly attempts to maintain equal-time propagation of the received signals from the various wires, a significant design simplification may be made. Rather than requiring measurement of the signal transition times at each data wire as well as performing the necessary center-of-eye sampling to obtain the relevant data values, the wires carrying the transmitted clock information may be used as proxies or analogs for the data wires in said transition time measurement. Thus, timing-related operations are limited to the clock information wires, and data sampling operations to the data wires in this simplified receiver design.

One familiar with the art may note that conventional receiver PLL designs, as one example, already obtain clock timing information from clock information wires, to serve as an external phase reference for the PLL internal oscillator. However, in the known art this is a fixed relationship, and is thus not informed by subtleties of receive eye shape, symmetry, etc. which are well known to influence the correct timing of a data measurement or sampling operation on the received data values. Moreover, this phase relationship may vary undesirably as a result of changes in temperature, power supply voltage, or other characteristics of the communication system devices. In contrast, the embodiments described herein utilize signals from the clock information wires not only as a phase reference for the phase-locked loop, but also as a proxy or analog of a data wire signal transition measurement to determine an appropriate offset from that phase reference to optimize data wire sample timing.

Transmitter

One embodiment of a transmitter is shown in the block diagram of FIG. 1. In this embodiment, data is communicated using a 5b6w vector signaling code as described in [Shokrollahi II], thus encoder 110 accepts five transmit data bits and encodes them into a six element codeword which, when emitted by line drivers 130, will be carried by six wires of the communications medium. Simultaneously, a clock signal is encoded by clock encoder 120 and emitted by line driver 130 to be carried by the remaining two wires of the communications medium. In this embodiment, the clock signal transmitted at the same signal levels as the encoded data, in an encoded format equivalent to a differential square wave clock at one eighth rate thus, as examples without implying limitation, corresponding to four consecutive unit intervals of "high" signal level on the first clock wire and "low" signal level on the second clock wire, followed by four consecutive unit intervals of "low" signal level on the first clock wire and "high" signal level on the second clock wire, where "high" and "low" are chosen from the set of signal levels used to carry data codeword values.

To ensure that all transitions on all communications wires are simultaneous at the transmitter, one transmitter embodiment utilizes identical control logic and drivers to generate signals on all eight communications wires. Thus, data encoder 110 and clock encoder 120 have essentially equal propagation delays and all line drivers 130 are identical. Some embodiments may further align transmission by using a common clock signal to control the emission of new output values from the line drivers. One familiar with the art will understand that under such conditions the transmitted clock signal may be interpreted as another vector encoded data signal communicating one bit of clock information on two wires, albeit an encoded signal that continuously repeats the same eight unit interval pattern.

For purposes of illustration the transmitter embodiment described herein is shown as utilizing a single processing phase, while the receiver embodiment is shown as utilizing four parallel processing phases, in neither case implying a limitation. Depending on the available integrated circuit process capabilities and overall data throughput requirements, fewer or greater numbers of processing phases encompassing smaller or greater portions of the system may be utilized in combination with described embodiments.

Receiver Data Detection

As described in [Holden I] and [Ulrich I], vector signaling codes may be efficiently detected by linearly combining sets of input signals using Multi-Input comparators or mixers (MIC). For the example 5b6w code (also referred to herein as the Glasswing code), five such mixers acting on weighted subsets of the six received data input signals will detect the five data bits without need of further decoding. In some embodiments, MIC outputs are differential analog levels that will later be sliced and sampled by digital comparators and/or flip-flops. In other embodiments, the MICs are configured to perform a slicing operation, and the MIC outputs only need to be sampled. One additional mixer acting on combinations of the two received clock signals will similarly detect the non-skewed reference clock signal.

Figure 2:
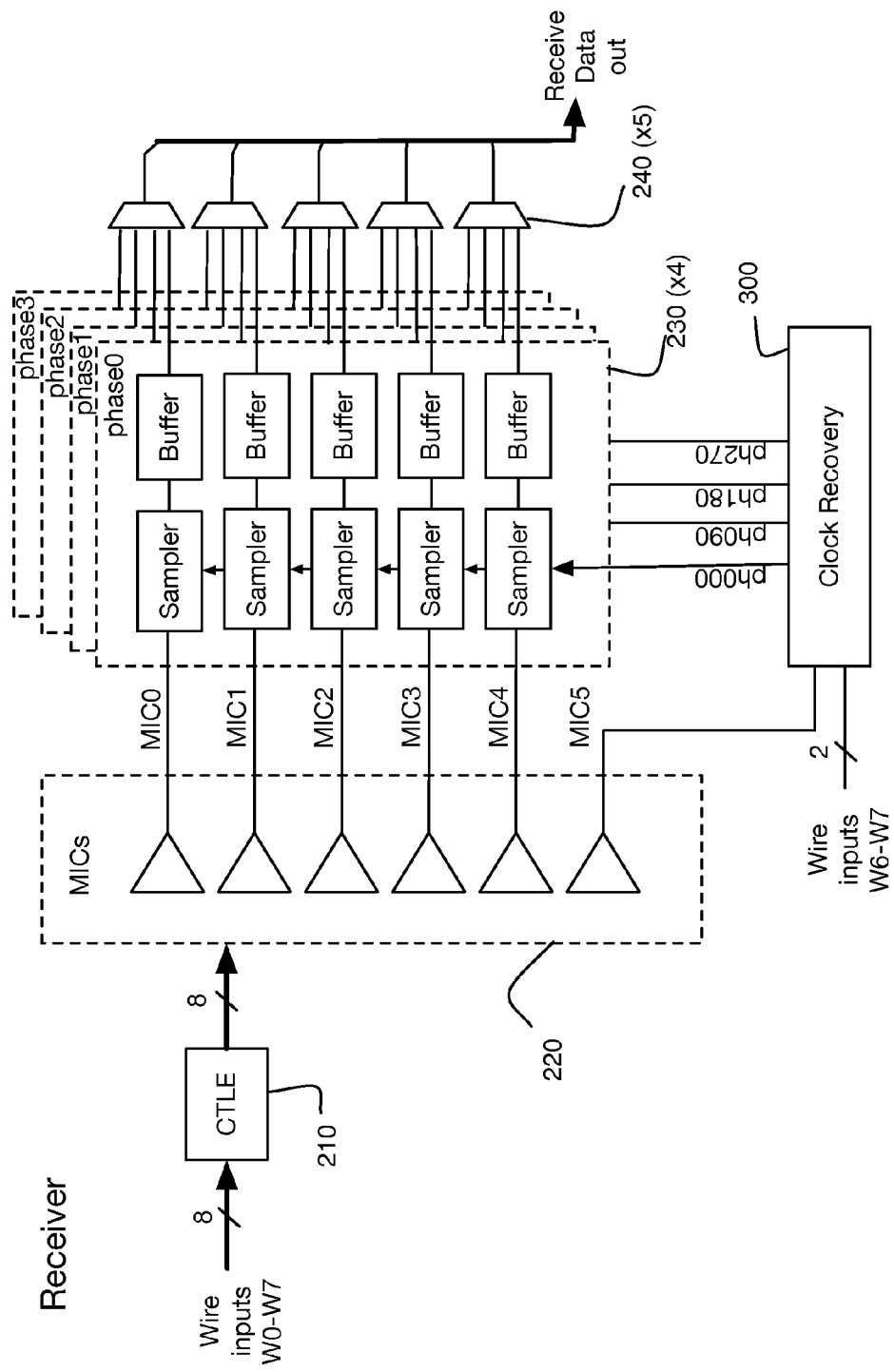
FIG. 2 is a block diagram of one embodiment of a receiver compatible with the transmitter of FIG. 1.

As shown in FIG. 2, one embodiment of a data receiver is composed of eight identical CTLE stages 210 operating on the six data wires and two clock wires. This collection of equalized received signals is presented to a set of six MIC mixers 220. As described in [Shokrollahi II] a set of multi input comparators detecting the 5b6w code are:

$$MIC0 = W0 - W1 \quad \text{(Eqn. 1)}$$

$$MIC1 = \tfrac{1}{2}W0 + \tfrac{1}{2}W1 - W2 \quad \text{(Eqn. 2)}$$

$$MIC2 = W3 - W4 \qquad \text{(Eqn. 3)}$$

$$MIC3 = \tfrac{1}{2}W3 + \tfrac{1}{2}W4 - W5 \qquad \text{(Eqn. 4)}$$

$$MIC4 = \tfrac{1}{3}W0 + \tfrac{1}{3}W1 + \tfrac{1}{3}W2 - \tfrac{1}{3}W3 - \tfrac{1}{3}W4 - \tfrac{1}{3}W5 \qquad \text{(Eqn. 5)}$$

Similarly, the described encoded clock may be detected as:

$$MIC5 = W6 - W7 \qquad \text{(Eqn. 6)}$$

Where W0-W7 are the (optionally amplified and equalized) signals received from communication wires 0-7.

The five MIC outputs MIC0-MIC4 are processed using a plurality of processing slices in four parallel phases of receive data processing, each phase 230 including five data sampling units and subsequent buffering, followed by recombination of the four phase MIC outputs into a received data stream, shown in FIG. 2 as being performed by multiplexers 240.

The detected non-skewed reference signal (also referred to herein as a detected clock signal) MIC5 and non-CTLE clock signals W6-W7 are processed by the receiver clock recovery PLL 300 which extracts the received clock signal and produces multiple phased sampling clocks (i.e. internal clocks of appropriate rates and phases). In particular, phased sampling clock ph000 is aligned to optimally trigger data sampling units in the phase0 phase of processing, clock ph090 in phase1, clock ph180 in phase2, and clock ph270 in phase3.

One knowledgeable in the field will note that utilizing the same processing steps and circuit designs for all input signals and maintaining consistent circuit loading across data and clock circuit nodes minimizes the introduction of differential delays among the received signals. In at least one embodiment, these practices extend to equal-length signal path routing from external I/O connections to the chip and then within the integrated circuit, and "star" termination of each wire input via on-chip resistors connected at a single point. Similarly, [Ulrich 1] describes an efficient MIC design in which the input scale factors are represented using sets of identical transistors. In one alternative embodiment incorporating a MIC design of this type, Eqn. 6 is rewritten to be $$MIC5 = W6 + W6 + W7 - W6 - W7 - W7 \qquad \text{(Eqn. 7)}$$

so that CTLE outputs W6 and W7 are presented with loads (e.g. the number of driven MIC input transistors in the [Ulrich I] design) that are comparable to the loads placed on the other CTLE outputs to minimize differential propagation delay effects.

Receiver Clock Recovery

The receiver clock recovery PLL 300 performs two operations. First, it multiplies the input clock frequency and generates four phased sampling clocks suitable for triggering the samplers of the four data phases, once per received unit interval. Second, it generates an additional sampling clock suitable for triggering the clock sampler, the result of which will be used to adjust the overall PLL phase such that the data sampling occurs at or near the center of the received eye pattern.

Figure 3:
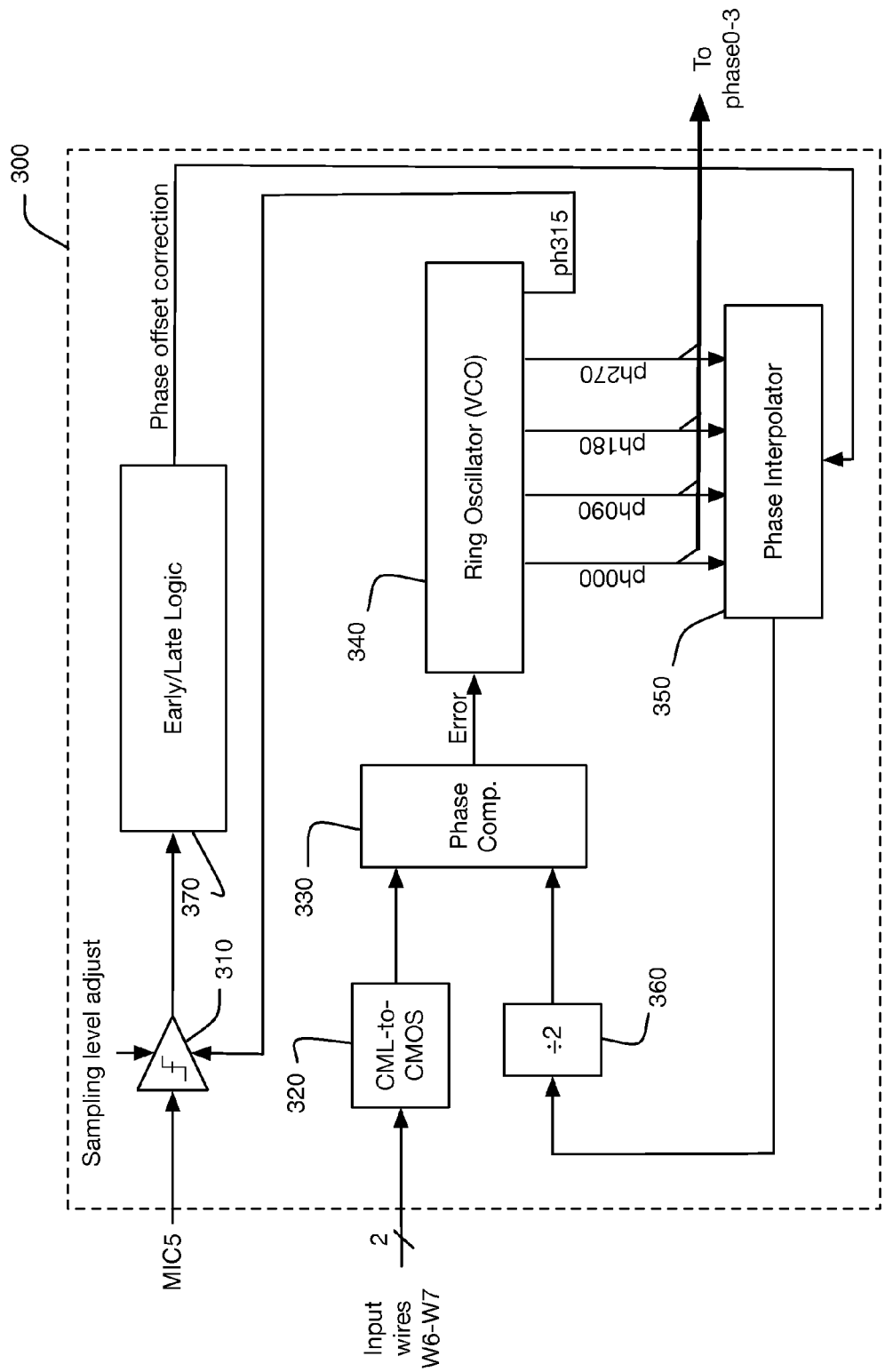
FIG. 3 is a block diagram detailing one embodiment of the clock recovery circuit used by the receiver of FIG. 2.

One such PLL embodiment is illustrated in FIG. 3. A local ring oscillator 340 comprising a sequence of identical gates in a closed loop is used as the internal Voltage Controlled Oscillator (VCO) timing source for the PLL. The VCO frequency is varied by analog adjustment of at least one of: gate propagation delay, inter-gate rise and fall time, and gate switching threshold within the local ring oscillator. Outputs taken at equal intervals (i.e. separated by equal numbers of ring oscillator gates) along the sequence of gates comprising the ring oscillator provide the four phased sampling clocks, herein identified as the 0, 90, 180, and 270 degree clocks. One additional output tap at half of interval between the 270 and 0 degree taps provides another sampling clock identified as the 315 degree clock.

In one embodiment, the local ring oscillator comprises eight identical sets of logic gates, thus the phase difference from one such set to the next is 45 degrees. In this embodiment, the 0, 90, 180, and 270 degree outputs may be obtained, as examples, from the second, fourth, sixth, and eighth outputs, while the 315 degree output in the same example may be obtained from the first output. As many variations of such designs are known in the art, neither the number of elements in the local ring oscillator nor the specific taps at which particular outputs are made should be construed as implying a limitation. As one example, the location of the 0 degree tap is arbitrary, as one familiar with the art will recognize that normal PLL behavior will phase align the local ring oscillator with the external phase reference regardless of its initial phase. Similarly, equivalent designs may be obtained in which the phased sampling clocks do not have square wave duty cycles; as one example being produced by the action of AND or OR gates with inputs from different tap locations.

One familiar with the art will recognize the 315 degree clock as being equivalent to a clock having a −45 degree phase relative to the 0 degree clock, i.e. occurring earlier than the 0 degree clock by one-half of the 90 degree span between phased data sampling clocks. Thus, the 315 degree clock is well suited to capture the rising or falling edge of the non-skewed reference signal, as ideally all input signals transition one half UI (that is, one half clock span) before the desirable center-of-eye data sampling region. As the non-skewed reference signal alternates four UIs high and four UIs low, the same 315 degree clock will alternately sample the clock rising and falling edge.

Figure 8:
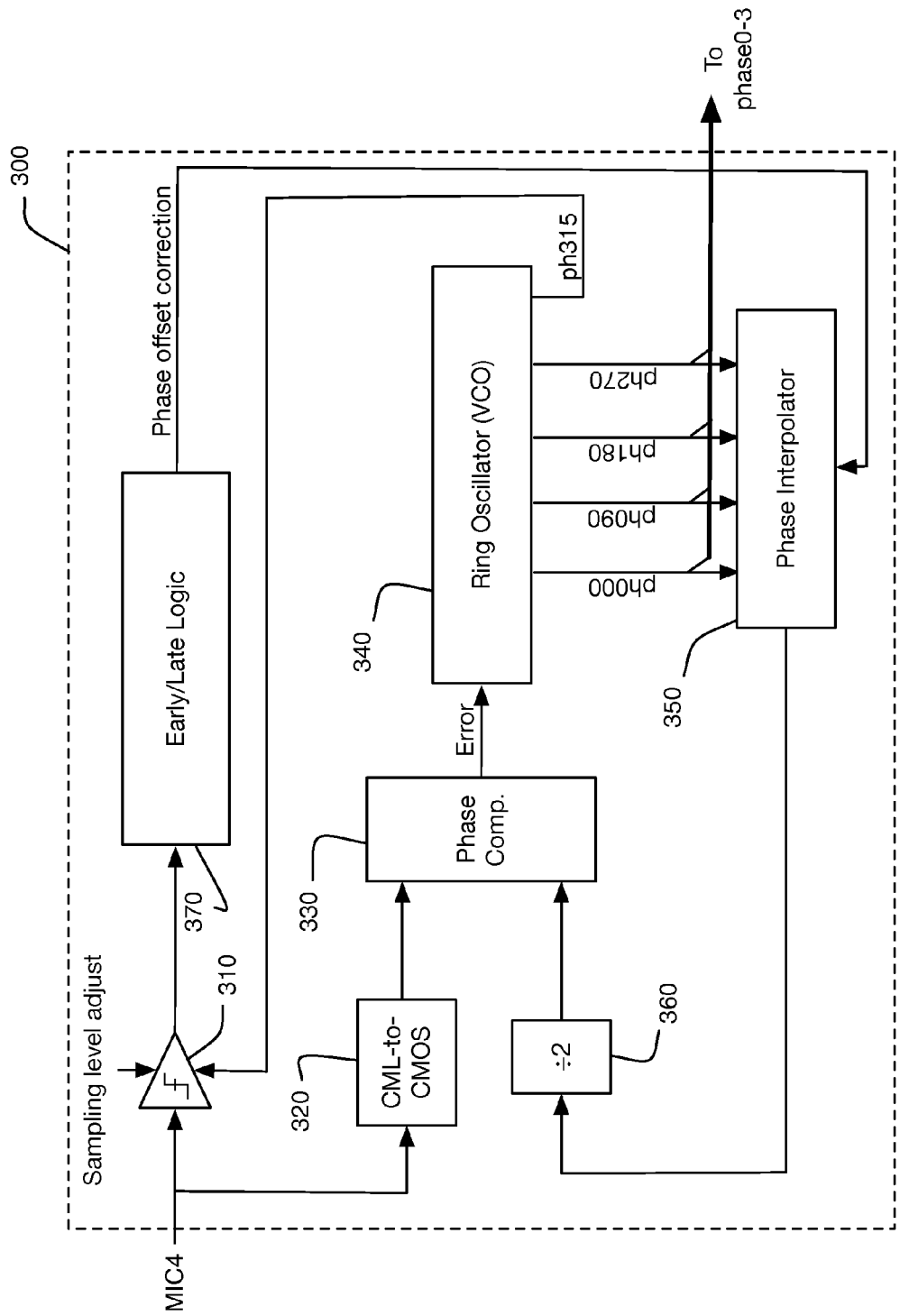
FIG. 8 is a block diagram detailing on embodiment of the clock recovery circuit used by the receiver of FIG. 7.

Following conventional PLL design, local ring oscillator 340 output is divided by two using a flip-flop 360 and presented as one input to a conventional CMOS phase comparator 330. The other phase comparator input is a skewed reference signal provided by a conventional CML-to-CMOS 320 converter driven by the non-CTLE clock signals W6 and W7. In some embodiments, the CML-to-CMOS 320 converter is configured to receive a differential input signal, and continuously output a single ended signal. In some embodiments, the single ended signal represents a digital waveform. The comparator input provided by the conventional CML-to-CMOS 320 converter may have an associated skew error introduced by the converter 320, and therefore is a skewed reference signal. In some embodiments, the CML-to-CMOS converter 320 approximates the delay characteristics of CTLE stages 210, and the associated skew error corresponds to any differences. In some embodiments, the CML-to-CMOS converter accepts the non-skewed reference signal MIC 5 (which is at CML logic levels at its clock MIC source) as a differential input and provides the skewed reference signal to the phase comparator. In such embodiments, the associated skew error also corresponds in part directly to the skew introduced by CML-to-CMOS converter 320. An example of a clock recovery circuit accepting only a differential MIC output is depicted by FIG. 8. Phase comparator 330 produces output Error (also referred to herein as an oscillator adjustment signal), which is an analog signal proportional to both the sign and magnitude of the difference between the timing of the signal edges of its two inputs. Following conventional PLL practice, the oscillator adjustment signal controls the local ring oscillator 340 frequency, such that in PLL lock there will be a fixed phase relationship (e.g. zero degrees) between the two phase comparator inputs, and the local ring oscillator will be operating at twice the input clock frequency.

To allow the overall phase of the locked PLL signals to be offset from the reference clock input phase, the local ring oscillator output presented to the divider is obtained from a phase interpolator 350 as a phase offset feedback signal having a phase offset that corresponds to an estimated skew error (which may be introduced by converter 320 in some embodiments), and wherein the phase is controllably intermediate between its input phased sampling clocks. Thus, the PLL may lock with its fixed phase relationship, while the internal clock signals obtained from local ring oscillator 340 will be offset from that fixed phase by the phase delay amount introduced by phase interpolator 350, as controlled by signal Phase offset correction, based on an independent phase measurement made on the sampled non-skewed reference signal. Phase interpolators are known in the art, one example being provided by [Buchwald I].

In one embodiment, phase interpolator 350 receives eight distinct phased sampling clocks from the local ring oscillator having 45 degree phase differences. Said phase interpolator may be controlled to select two adjacent phased sampling clocks and then to interpolate between them so as to produce the phase offset feedback signal at a chosen phase offset between those selected two values.

Data sampling unit 310, identical to those sampling data at 230 in FIG. 2, samples the raw MIC5 non-skewed reference signal as triggered by clock ph315, producing a binary (e.g. sign only) early/late timing indication. Under optimum conditions, this sample timing will be concurrent with rising and falling clock edges producing statistically equal percentages of early vs late indications, and Early/Late logic 370 will not modify the existing phase interpolator setting. Conversely if the indications are consistently early or consistently late, Early/Late logic 370 will increment or decrement the phase interpolator offset signal by a fixed amount, in an attempt to align the sampling interval with the non-skewed reference signal transitions. In some embodiments, the independent phase measurement made by Early/Late Logic 370 may be subsumed by control software executing in a system management processor. In other embodiments, a comparable function may be performed by an analog or digital low-pass filter integrating the early/late indications to produce a correction signal for the phase interpolator, as well understood in the art. In practice, the phase interpolator setting may only require infrequent adjustment. One embodiment simplifies Early/Late Logic 370 to only act on every other clock sample, e.g. those representing rising clock edges. Further embodiments disable or power down portions of this adjustment loop except for periodic measurement and adjustment intervals, to further reduce receiver power utilization.

It should be noted that certain standard design elements such as CML-to-CMOS converter 320 are known to have propagation delays that can vary over temperature or supply voltage. Thus, without the periodic phase adjustment provided by this additional sampling and adjustment loop, the locked phase of PLL 300 (and thus the sampling time for the data signals) would drift relative to the received signals, degrading or disrupting data detection.

As the rising and falling edges of the MIC5 non-skewed reference signal are significantly ramped (due to the inevitable high frequency attenuation over practical communications channels at 25 Gbps) small changes in sampler 310 amplitude threshold can produce comparable incremental adjustments in the transition timing, and thus produce incremental timing offsets in the resulting sampling clocks. Thus, analog signal Sampling level adjust is input to sampler 310 to permit this small incremental adjustment as controlled by an external command/control or administrative interface.

For purposes of description, it may be assumed that a phase detector design is used which drives the PLL to lock with a zero phase differential between the two phase detector inputs. Thus, continuing the example, applying the 0 and 90-degree clock phases as inputs to the phase interpolator allows adjustment such that the PLL leads the reference clock input by between 0 and 90 degrees. It will be apparent that equivalent results with comparable phase offsets may be obtained using other pairs of degree clocks and/or other phase detector designs (e.g. other known phase detector designs drive the PLL to lock with a 90 degree phase differential) thus neither the particular phase clocks chosen nor the particular phase detector design described herein are limiting.

Receiver Timing

Figure 4:
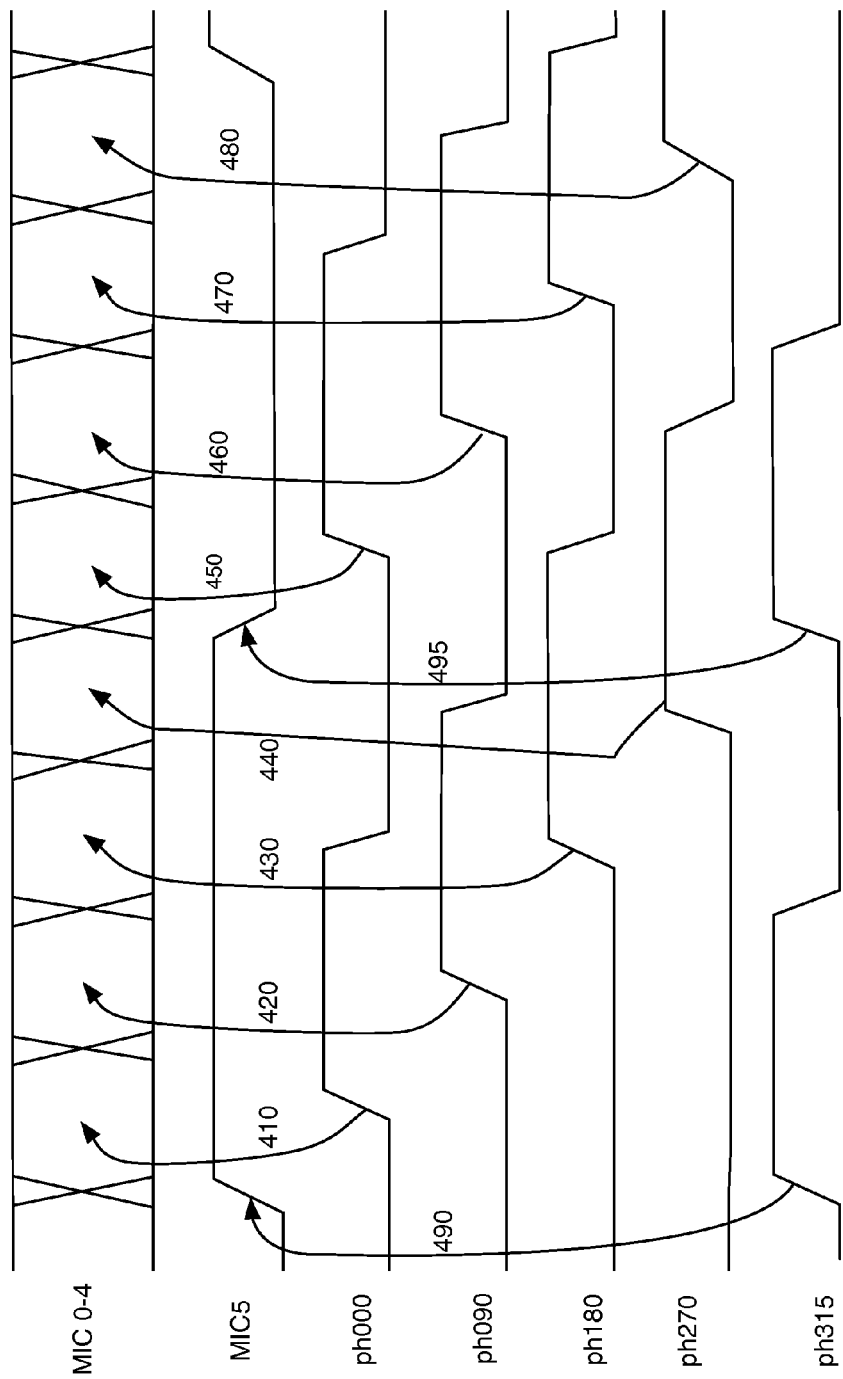
FIG. 4 is a timing diagram showing the interaction between the recovered clocks and received data in the embodiments of FIGS. 2 and 3.

FIG. 4 details the relationship between received data and clock signals and the internally generated clocks in the example receiver embodiment. For purposes of illustration, the clock phases obtained from the ring oscillator are shown as square waves, without limitation, as only the rising edge of said clocks are used in the description.

Signals MIC 0-4 are the five detected data MIC outputs from MICs 220 of FIG. 2, and signal MIC 5 is the corresponding non-skewed reference signal. The clock recovery PLL of FIG. 4 produces four phased sampling clocks ph000, ph090, ph180, and ph270, each having a rising edge corresponding to the optimum sampling time to capture received data from consecutive UIs of MIC 0-4, as in 410, 420, 430, 440, 450, 460, 470, 480. The half-UI-offset clock ph315 has a rising edge corresponding to rising and falling edges of received non-skewed reference clock signal MIC5, as shown at 490 and 495. Thus, assuming relatively symmetrical receive eyes and consistent propagation delays across all received signals, aligning ph315 with the clock edges will simultaneously position ph000, ph090, phi 80, and ph270 for optimum data sampling within the four parallel receiver processing slices phase0, phase1, phase2, and phase3 of FIG. 2.

In at least one embodiment, an apparatus comprises a phase interpolator configured to operate on a pair of local oscillator feedback signals and an independent phase measurement made on a sampled non-skewed reference signal and to responsively generate a phase offset feedback signal having a phase offset corresponding to an estimated skew error, and, a phase comparator configured to receive a skewed reference signal having an associated skew error and the phase offset feedback signal, and to generate an oscillator adjustment signal representing in part a difference between the estimated skew error and the associated skew error.

Figure 5:
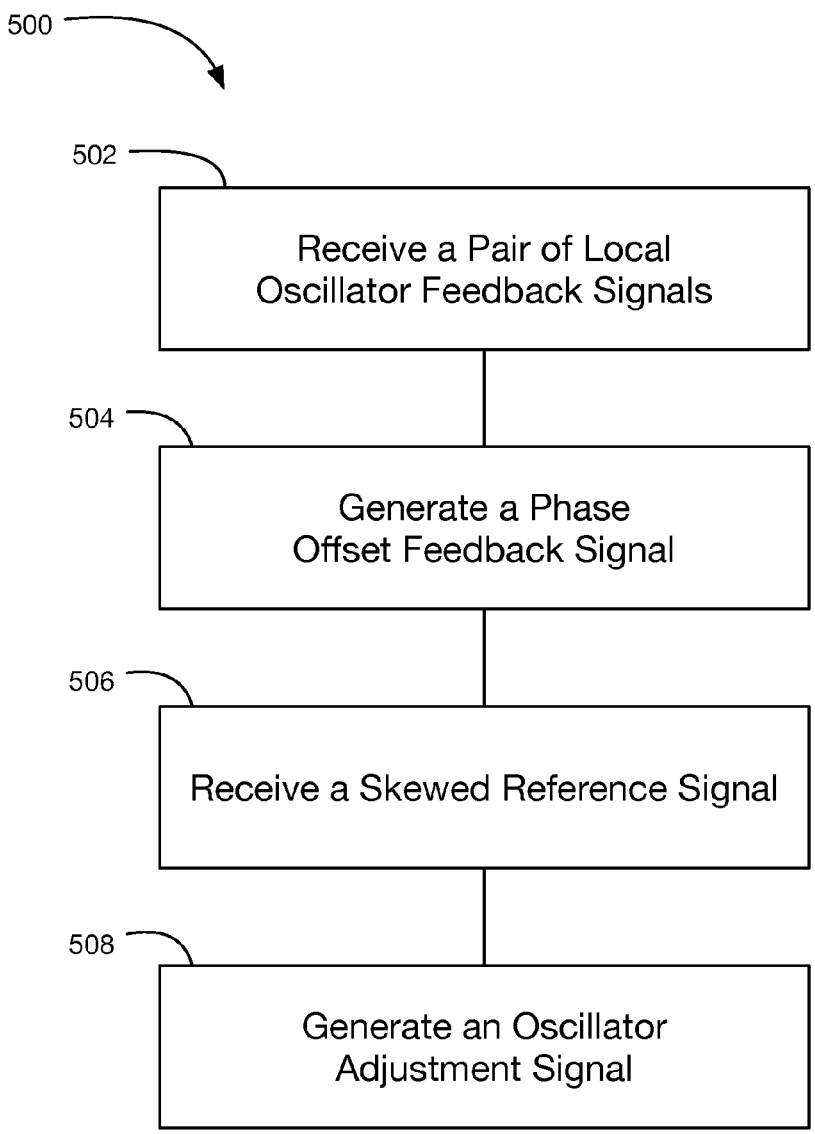
FIG. 5 is a flowchart of a process, in accordance with at least one embodiment

As shown in FIG. 5, a method 500 includes the steps of receiving, at step 502, a pair of local oscillator feedback signals and an independent phase measurement made on a sampled non-skewed reference signal, generating, at step 504, a phase offset feedback signal having a phase offset corresponding to an estimated skew error, receiving, at step 506, a skewed reference signal having an associated skew error and the phase offset feedback signal, and generating, at step 508, an oscillator adjustment signal representing in part a difference between the estimated skew error and the associated skew error.

Alternative Embodiments

Figure 6:
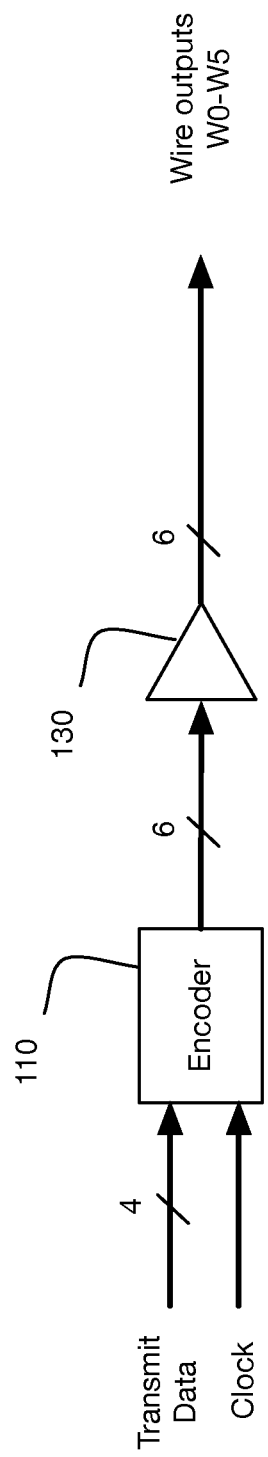
FIG. 6 is a block diagram of one embodiment configured to encode and transmit 4 bits and a clock on a six-wire communications channel.
Figure 7:
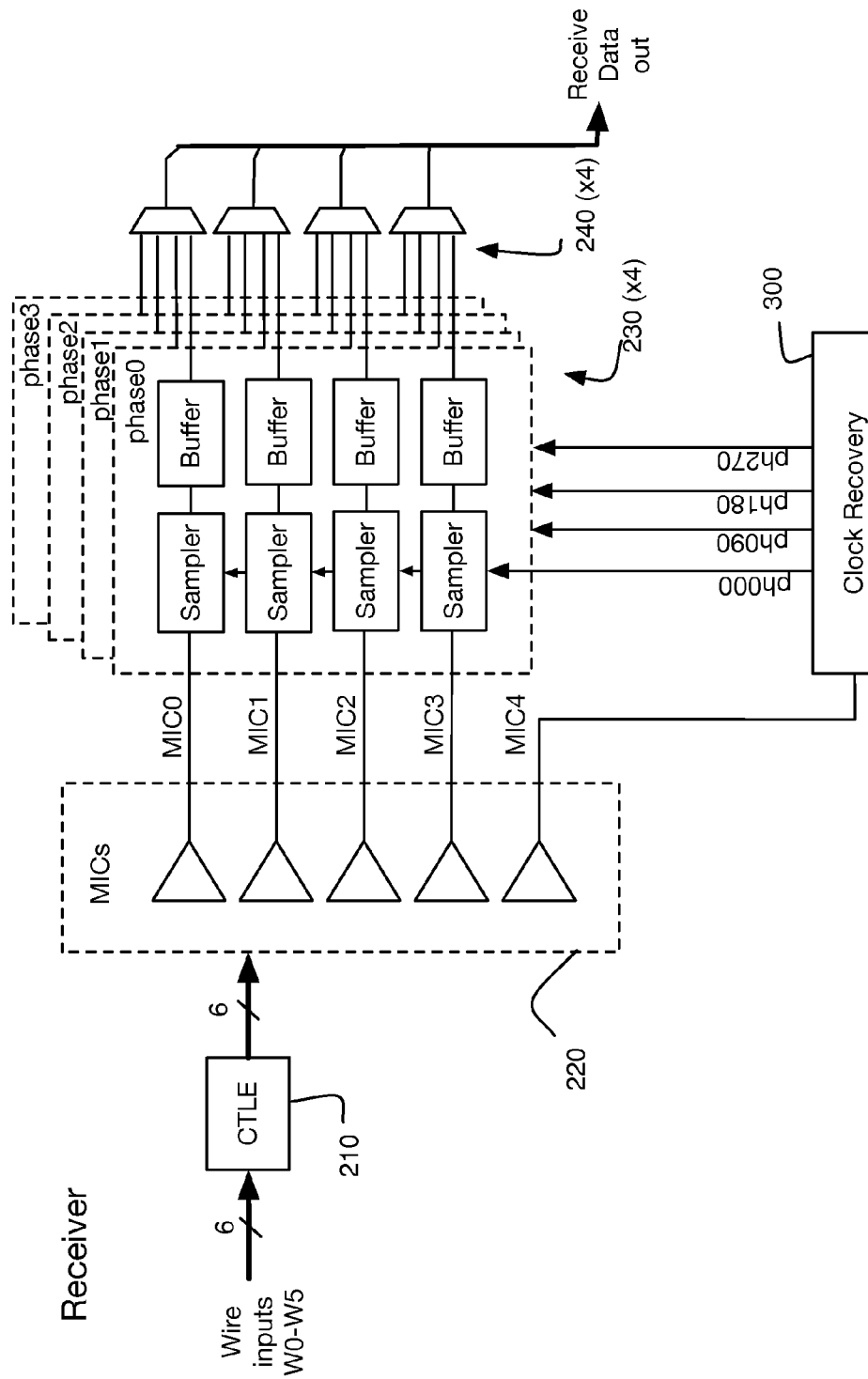
FIG. 7 is a block diagram of an embodiment of a receiver compatible with the transmitter of FIG. 6.

It will be readily apparent to one familiar with the art that the non-skewed reference clock signal received from MIC5 (Eqn. 6) after being transported over two dedicated clock wires could just as easily be received from, as one example MIC4, having been transported as one sub-channel of the vector signaling code also carrying the data. This method of embedding the clock in a vector signaling code sub-channel is described in [Shokrollahi II] and [Holden III]. All of the described clock embedding embodiments therein may be beneficially combined with the PLL and timing control mechanisms described herein, without limitation. An embodiment of a transmitter configured to provide an embedded clock in a Glasswing transmitter is shown in FIG. 6. An embodiment illustrating a receiver that may be used with the transmitter shown in FIG. 6 is shown in FIG. 7. FIG. 7 is similar to the embodiment shown in FIG. 2, the only difference being that rather than encoding a clock signal separately, the encoded clock signal is embedded into the sub-channel associated with MIC 4. The CML-to-CMOS converter accepts the MIC 4 signal as a differential input (as shown in an embodiment of a clock recover circuit depicted by FIG. 8), as there are no dedicated clock wires in the communication bus for such an embodiment. In some embodiments, MIC 4 may be configured to transition every fourth cycle (similar to MIC 5 above), in which case the differential signals input to CML-to-CMOS converter 320 will cause a binary output to change every fourth cycle. In other embodiments, MIC 4 may be configured to transition every cycle, in which case an edge detector or other devices may be used to reduced the frequency of the differential output of MIC 4. Edge detector embodiments are described in more detail below in further embodiments. The associated skew error in this embodiment also corresponds in part directly to the skew introduced by CML-to-CMOS converter 320, as described above. Furthermore, only 4 bits of data are detected at each processing slice (MIC outputs MIC0-MIC3), so pin efficiency is sacrificed for reduced transmitter/receiver complexity. Typically, when embedding a clock in a sub-channel, the highest-amplitude channel is chosen to carry the clock, as taught by [Shokrollahi I]. As a general design practice, this choice generally results in the clock channel having the best SNR, and thus the cleanest output results.

However, with the modest gain variations seen across the various Glasswing channels in actual embodiments, there is no significant practical motivation to select a particular sub-channel for the clock based on that criterion. In the embodiment of FIG. 5, the sub-channel defined by Eqn. 5 is designated to carry the embedded clock, as its symmetry and delay characteristics in a practical embodiment were found to be conducive to integration with the delay-and-sample behavior of conventional clock/data recovery circuits.

Figure 9:
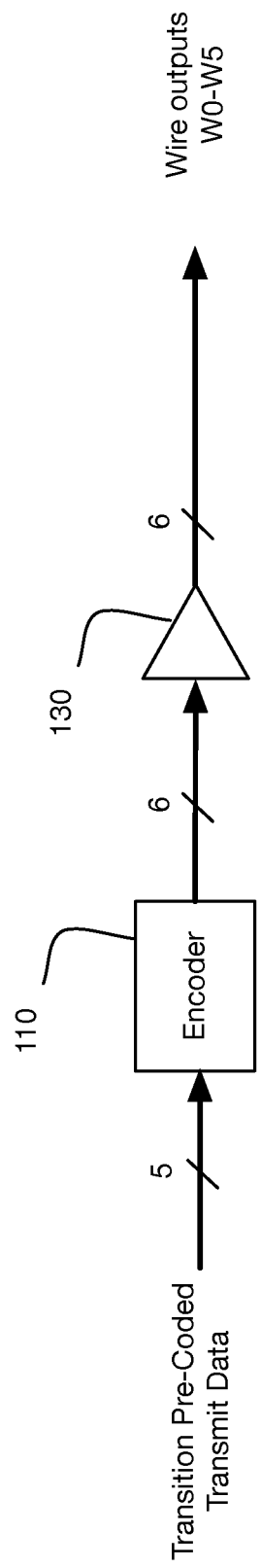
FIG. 9 is a block diagram of one embodiment configured to encode and transmit 5 bits on a six-wire communications channel using a transition encoder.
Figure 10:
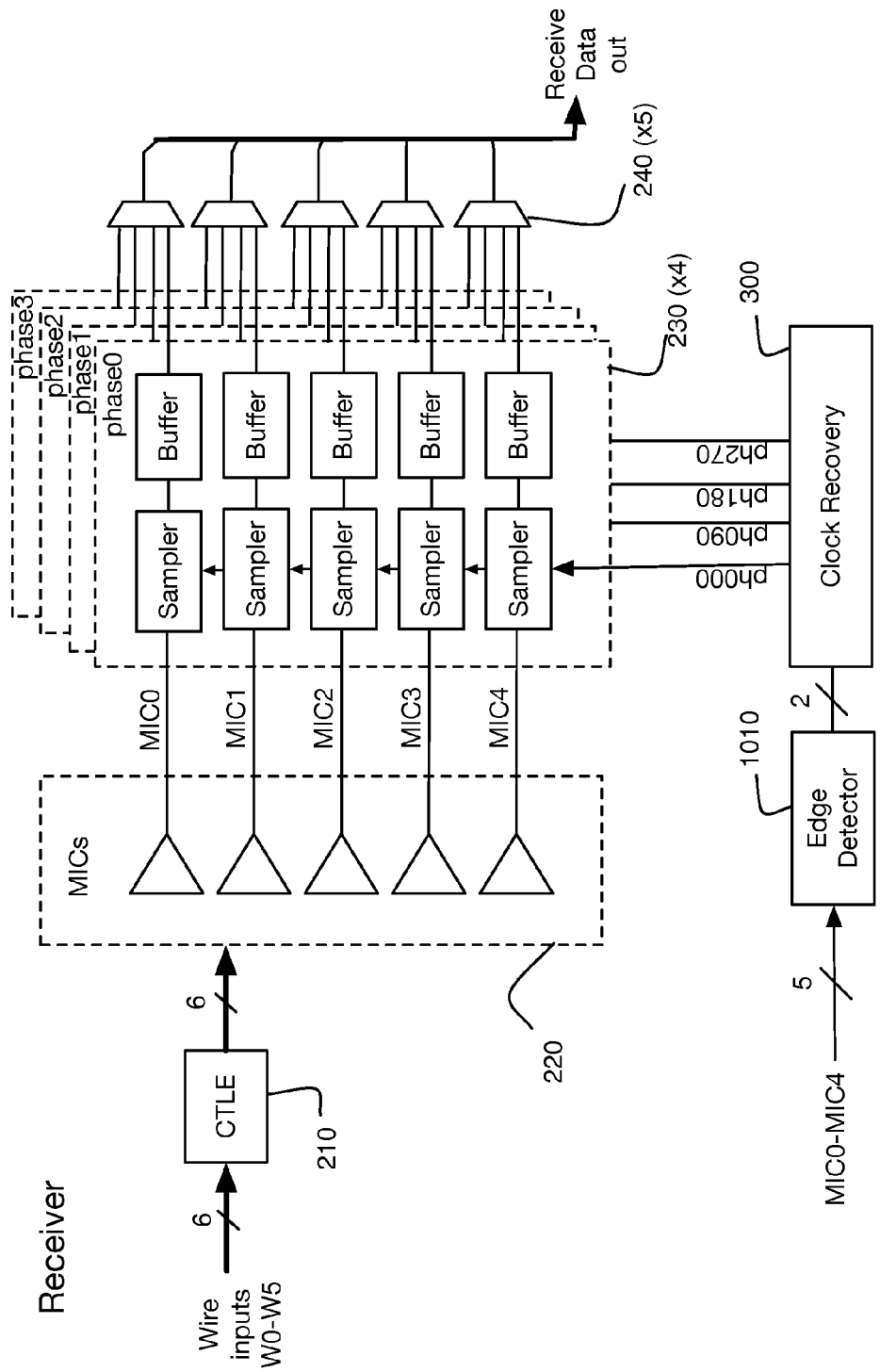
FIG. 10 is a block diagram of an embodiment of a receiver compatible with the transmitter of FIG. 9.

Similarly, known methods of communicating a clock signal using edge transitions of the data lines may be combined with the PLL and timing control mechanisms described herein. In particular, vector signaling codes with guaranteed transition density over time, such as taught by [Shokrollahi I] are amenable to such combination. A transmitter in accordance with such transition embodiments is shown in FIG. 9. The transition pre-coded transmit data is pre-coded so that at least one bit changes each transmission unit interval, for example using methods or apparatuses described in [Shokrollahi I]. FIG. 10 illustrates an embodiment of a receiver that is compatible with the transmitter of FIG. 9. An edge detector 1010 is configured to detect a transition among MIC outputs MIC0-MIC4, and use the transitions to provide the non-skewed reference signal to the clock recovery circuit 300. In some embodiments, the CML-to-CMOS converter and clock sampler accept a differential signal provided by the edge detector. In some embodiments, in order to reduce the frequency of the non-skewed reference signal, the edge detector 1010 could be configured to detect every fourth edge, using a counter and flip-flops for example. Also, other known methods and devices may be used to reduce the frequency of the non-skewed reference signal. Embodiments using transition codes have a benefit of increased pin-efficiency at the cost of increased encoding/decoding complexity.

We claim:

1. An apparatus comprising:
a phase interpolator configured to operate on a pair of local oscillator feedback signals and an independent phase measurement made on a sampled non-skewed reference signal and to responsively generate a phase offset feedback signal having a phase offset corresponding to an estimated skew error;
a phase comparator configured to receive a skewed reference signal having an associated skew error and the phase offset feedback signal, and to generate an oscillator adjustment signal representing in part a difference between the estimated skew error and the associated skew error;
a local oscillator configured to receive the oscillator adjustment signal and to responsively generate a plurality of phased sampling clocks, wherein two of the phased sampling clocks correspond to the pair of local oscillator feedback signals;
a comparator configured to slice the sampled non-skewed reference signal against a reference level and to provide a digital result; and,
an early-late logic circuit configured to receive the digital result and to responsively generate the independent phase measurement.

2. The apparatus of claim 1, further comprising:
a clock sampling unit configured to generated the sampled non-skewed reference signal by sampling a non-skewed reference signal;
a plurality of processing slices, each processing slice receiving a respective phased sampling clock of the plurality of phased sampling clocks, each processing slice comprising:
a plurality of sampling units configured to sample a plurality of multi-input comparator (MIC) outputs according to the respective phased sampling clock received by each of the plurality of sampling units in the processing slice, wherein the plurality of sampling units have the same circuit structure as the clock sampling unit; and
a plurality of multiplexors configured to receive the sampled MIC outputs from each processing slice and to form a received data stream.

3. The apparatus of claim 2, further comprising:
a plurality of multi-input comparators (MICs), a portion of the MICs configured to receive a plurality of signals corresponding to symbols of a codeword, and to responsively form the plurality of MIC outputs, and at least one MIC configured to receive an encoded clock signal and to responsively generate the non-skewed reference signal.

4. The apparatus of claim 2, further comprising:
a plurality of multi-input comparators (MICs) configured to receive a plurality of signals corresponding to symbols of a codeword, and to responsively form the plurality of MIC outputs; and, an edge detector circuit configured to generate the non-skewed reference signal based on a transition of at least one of the MIC outputs.

5. The apparatus of claim 1, wherein the phased sampling clocks correspond to outputs of a ring oscillator within the local oscillator.

6. The apparatus of claim 5, wherein the ring oscillator comprises 8 logic gates connected in series, the logic gates having the same circuit structures, and wherein adjacent outputs of the identical logic gates have phase differences of 45 degrees.

7. The apparatus of claim 1, further comprising a sample level adjust signal configured to adjust a magnitude of the reference level.

8. The apparatus of claim 1, wherein the early-late logic circuit comprises a filter configured to receive the digital result and to generate the independent phase measurement.

9. A method comprising:
receiving a pair of local oscillator feedback signals and an independent phase measurement made on a sampled non-skewed reference signal and responsively generating a phase offset feedback signal having a phase offset corresponding to an estimated skew error;
receiving a skewed reference signal having an associated skew error and the phase offset feedback signal, and responsively generating an oscillator adjustment signal representing in part a difference between the estimated skew error and the associated skew error;
receiving, at a local oscillator, the oscillator adjustment signal and responsively generating a plurality of phased sampling clocks, wherein two of the phased sampling clocks correspond to the pair of local oscillator feedback signals;
slicing, using a comparator, the sampled non-skewed reference signal against a reference level and providing a digital result; and,
generating, using an early-late logic circuit, the independent phase measurement based on the digital result.

10. The method of claim 9, further comprising:
generating the sampled non-skewed reference signal by sampling a non-skewed reference signal using a clock sampling unit;
receiving, at a respective processing slice of a plurality of processing slices, a respective phased sampling clock of the plurality of phased sampling clocks, and for each processing slice:
sampling, using a plurality of sampling units, a plurality of multi-input comparator (MIC) outputs according to the respective phased sampling clock, wherein the plurality of sampling units have the same circuit structure as the clock sampling unit; and
receiving the sampled MIC outputs from each processing slice at a plurality of multiplexors, and responsively forming a received data stream.

11. The method of claim 10, further comprising:
receiving, at a plurality of MICs, a plurality of signals corresponding to symbols of a codeword, and responsively generating the plurality of MIC outputs; and,
receiving, at a dedicated clock MIC, an encoded clock signal, and responsively generating the non-skewed reference signal, wherein the plurality of MICs and the dedicated clock MIC have the same circuit structure.

12. The method of claim 10, further comprising:
receiving, at a plurality of multi-input comparators (MICs), a plurality of signals corresponding to symbols of a codeword, and responsively forming the plurality of MIC outputs; and,
generating, using an edge detector circuit, the non-skewed reference signal based on a transition of at least one of the MIC outputs.

13. The method of claim 9, wherein the phased sampling clocks correspond to outputs of a ring oscillator within the local oscillator.

14. The method of claim 13, wherein the ring oscillator comprises 8 logic gates connected in series, the logic gates having the same circuit structure, and wherein adjacent outputs of the identical logic gates have phase differences of 45 degrees.

15. The method of claim 9, further comprising adjusting a magnitude of the reference level using a sample level adjust signal.

16. The method of claim 9, wherein the early-late logic circuit comprises a filter configured to receive the digital result and to generate the independent phase measurement.

17. The apparatus of claim 1, wherein the skewed reference signal is received via a current-mode logic (CML) to complementary metal-oxide semiconductor (CMOS) converter.

18. The apparatus of claim 17, wherein the associated skew error is a temperature-dependent skew error induced by the CML to CMOS converter.

19. The method of claim 9, further comprising receiving the skewed reference signal via a current-mode logic (CML) to complementary metal-oxide semiconductor (CMOS) converter.

20. The method of claim 19, wherein the associated skew error is a temperature-dependent skew error induced by the CML to CMOS converter.

* * * * *